Aug. 31, 1937.    I. H. JUDD    2,091,406
RUNNING GEAR ASSEMBLY
Original Filed June 3, 1935    2 Sheets-Sheet 1
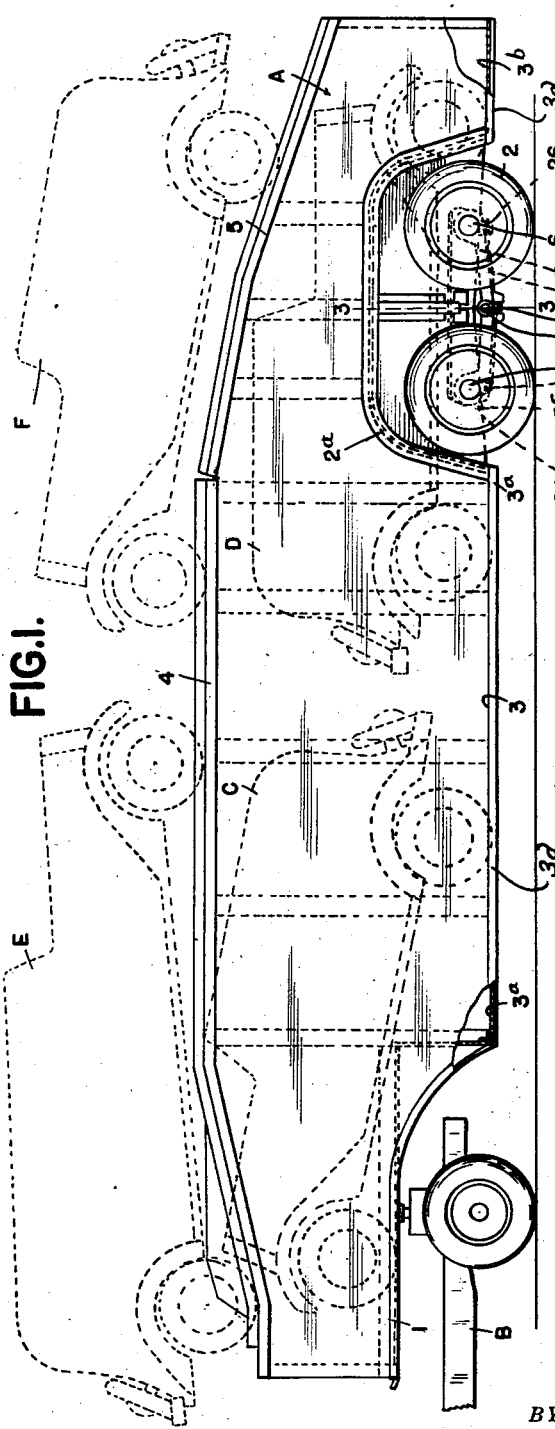
INVENTOR
IRVING H. JUDD
BY
ATTORNEYS Aug. 31, 1937.  I. H. JUDD  2,091,406
RUNNING GEAR ASSEMBLY
Original Filed June 3, 1935  2 Sheets-Sheet 2
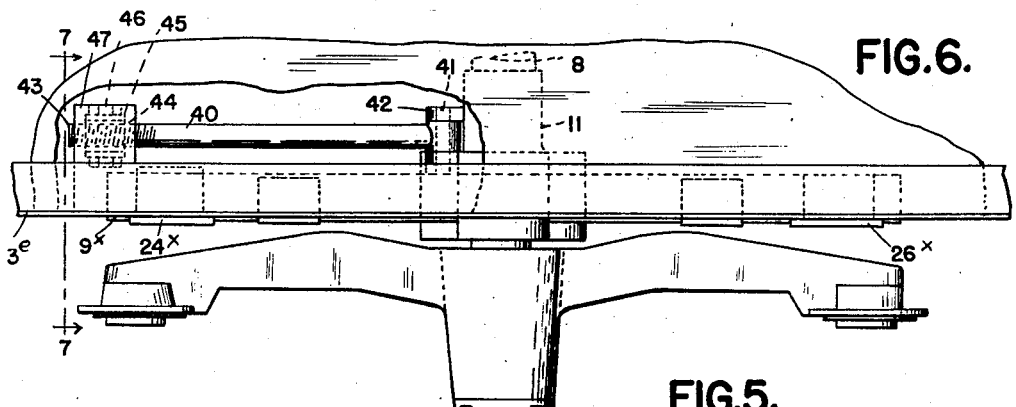
FIG. 6.
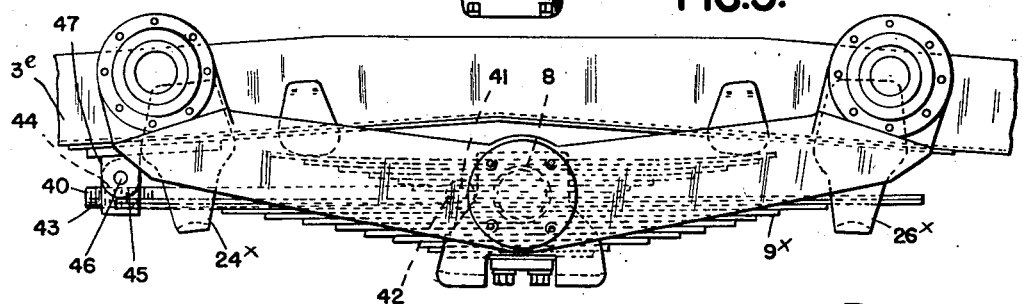
FIG. 5.
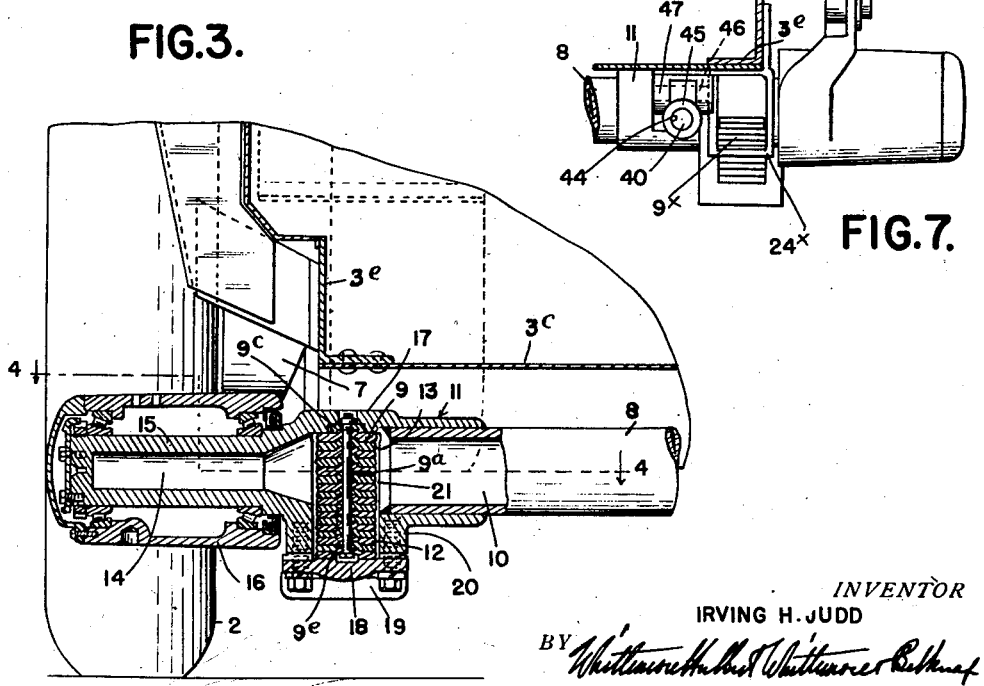
FIG. 3.
FIG. 7.
INVENTOR
IRVING H. JUDD
BY
ATTORNEYS Patented Aug. 31, 1937

2,091,406

UNITED STATES PATENT OFFICE 2,091,406

RUNNING GEAR ASSEMBLY

Irving H. Judd, Dearborn, Mich., assignor to Whitehead & Kales Company, River Rouge, Mich., a corporation of Michigan Original application June 3, 1935, Serial No. 24,738. Divided and this application April 20, 1936, Serial No. 75,480

7 Claims. (Cl. 280—124)

This invention relates generally to running gear assemblies for vehicles such as trailers or semi-trailers having an over-all width of eight feet, and constitutes a division of my application filed June 3, 1935, bearing Serial No. 24,738.

One of the essential objects of the invention is to provide tandem wheel running gear of the type mentioned which permits a supporting deck for automobiles, merchandise or other cargo to be carried close to the ground, so that the over-all height of the vehicle will be at a minimum and the loading and unloading thereof will be easier.

Another object is to provide a running gear that permits the deck aforesaid to be carried between the tandem wheels at opposite sides of the vehicle without the latter exceeding the statutory width of eight feet.

Other objects, advantages and novel details of construction of this invention will be made more apparent as this description proceeds, especially when considered in connection with the accompanying drawings, wherein:

Figure 1 is a side elevation of a trailer having a running gear embodying my invention, showing a fragmentary elevation of a truck supporting the forward end of the trailer, and showing by dotted lines the positions of automobiles when loaded upon said trailer;

Figure 2 is an enlarged fragmentary elevation of the running gear and associated parts;

Figure 3 is a sectional view taken substantially on the line 3—3 of Figure 1;

Figure 4 is a sectional view taken substantially on the line 4—4 of Figure 3 and showing parts broken away;

Figure 5 is a side elevation of a slight modification;

Figure 6 is a top plan view of the construction illustrated in Figure 5;

Figure 7 is a sectional view taken on the line 7—7 of Figure 6.

Referring now to the drawings, A is a two-deck four-car carrying trailer provided at its forward end with a stepped portion 1 for attachment to a power driven vehicle such as a truck B, and provided at its rear end with ground-engaging wheels 2 arranged in tandem.

The lower deck 3 of the trailer extends substantially horizontally as at 3ª and 3ᵇ fore and aft of suitable housings 2ª for the wheels 2 and is slightly arched as at 3ᶜ between said housings. The upper deck 4 is substantially arcuate in configuration and is provided at its rear end with a hingedly mounted portion 5 which may be raised to permit loading of automobiles upon or unloading of automobiles from the lower deck 3. As shown by dotted lines in Figure 1, two automobiles such as C and D, respectively, may be loaded in the position indicated upon the lower deck 3, while two automobiles E and F, respectively, may be loaded upon the upper deck 4.

Preferably the ground-engaging wheels 2 are mounted upon stub axles 6 projecting laterally outwardly from walking beams 7 pivoted intermediate their ends upon a transversely extending non-rotatable axle 8 disposed beneath the arched portion 3ᶜ of the lower deck and suspended by semi-elliptical leaf springs 9 from suitable sills 3ᵈ which carry the lower deck 3. Preferably the axle 8 has a tubular central section 10 and end pieces 11, the latter fitting tightly upon and welded to said section 10 as illustrated in Figure 3. The springs 9 extend through these end pieces 11 upon the inner sides of the walking beams 7 and have lower and upper sections 12 and 13, respectively bolted together midway of their ends. The lower sections 12 constitute the main springs while the upper sections 13 constitute the auxiliary springs. As shown, the end pieces 11 are cored out as at 14 to save weight and have reduced spindle-like end portions 15 upon which the hubs 16 of the walking beams are journaled. Intermediate these spindle-like portions 15 and the tubular central section 10, the end pieces 11 have inverted substantially U-shaped portions 17 that receive the springs 9. Clamps 18 are bolted in recesses 19 in the depending legs 20 of the U-shaped portions and cooperate with said U-shaped portions to form box-like openings 21 for the springs. Preferably the depending legs 20 of the U-shaped portions are provided at their lower ends with inturned portions 22 that not only strengthen the structure but also serve as shields for and protect the clamps 18 against being struck by objects in the road.

The lower sections 12 of the springs are pivoted at their forward ends on pins 23 carried by suitable brackets 24 fixed to slightly arched auxiliary sills 3ᵉ, and are slidably mounted at their rear ends in brackets 26 also fastened to the arched auxiliary sills 3ᵉ. The upper sections 13 of the springs are shorter than the lower sections 12 and have their opposite ends bearing against suitable brackets 27 fixed to the arched auxiliary sills 3ᵉ. To eliminate any shearing action on the spring center bolts 9ª which would be caused by the pulling action of the spring leaves, especially the main leaves 9ᵇ and leaves thereabove up to the cup washers 9ᶜ, I have formed each of the leaves of the spring 9 with downwardly opening cup-like centers 9ᵉ which fit snugly in one another as shown and take up the pulling action referred to. In this connection it will be noted that the cup-like centers 9ᵉ of the uppermost leaves of the springs fit snugly within the cup washers 9ᶜ and that the latter are piloted within the portions 17 of the end pieces 11. Thus, in use the main leaves 9ᵇ of the main springs which receive the pins 23 are in effect radius rods to keep the tandem wheels in alignment. Actually the pull is through these main leaves 9ᵇ and thereafter through each of the cup-like centers 9ᵉ, successively through all the leaves of the auxiliary springs 13 up to the cup washers 9ᶜ piloted within the portions 17 of the end pieces 11.

Thus, in my construction, the springs extend through the end pieces of the transversely extending non-rotating axle, and the latter is beneath the lower deck as well as below the axes of the ground-engaging wheels of the trailer. As a result, the lower deck of the trailer is much lower to the ground than heretofore. Actually the clearance between the ground and the horizontal portions 3ᵃ and 3ᵇ of the lower deck is only eight and three-fourths inches, consequently the loading and unloading of such deck is easier and the over-all height of the trailer is at a minimum.

In Figures 5 to 7, inclusive, I have illustrated a slight modification in which both ends of the leaf springs 9ˣ are slidably mounted in the supporting brackets 24ˣ and 26ˣ, and radius rods 40 are employed. As shown, the radius rods 40 are mounted at their rear ends upon pins 41 carried by forward projections 42 of the end pieces 11 of the axle 8 and are provided at their forward ends with threaded portions 43 that engage threaded openings 44 in brackets 45 swiveled upon pins 46 which in turn are carried by brackets 47 rigid with the undersides of the auxiliary sills 3ᵉ. Both the pins 41 and 46 are removable so that adjustments may be made. For instance, the pins 46 at the forward ends of the rods 40 may be removed so that the brackets 45 may be turned about the threaded portions 44 of the rods and then re-assembled with the brackets 47, or the pins 41 may be removed so that the rods 40 may be turned in the brackets 45. Inasmuch as the rods 40 are threaded in the brackets 45 and the latter are swiveled on the transversely extending pins 46, it will be apparent that universal joints have been provided which will compensate for free movement without subjecting the rods to torsional strains. If such threaded connections were eliminated, there would be torsional action in the radius rods caused, for example, from a shifting of the trailer load deflecting the springs more on one side than on the other of the trailer. Moreover, the threaded connections referred to permit an easy adjustment to square up the axle and running gear of the trailer.

What I claim as my invention is:

1. In a vehicle running gear assembly, a pair of laterally spaced longitudinally extending sills, an automobile carrying deck between and secured to said sills, a transversely extending non-rotatable axle below said sills and having axially aligned end pieces and an intermediate section, said end pieces having spindle-like portions and provided between said portions and the adjacent ends of said intermediate section with box-like openings, walking beams rockably mounted on said spindle-like portions and provided at opposite ends thereof with spindles for ground-engaging wheels, and means for yieldably suspending the axle from the vehicle including leaf springs extending through the box-like openings in said end pieces and terminally secured to said sills beside the walking beams.

2. In a vehicle running gear assembly, a pair of laterally spaced longitudinally extending sills, a transversely extending non-rotatable axle below said sills and having axially aligned end pieces and an intermediate section, said end pieces having spindle-like portions and provided between said portions and the adjacent ends of said intermediate section with box-like openings, walking beams rockably mounted on said spindle-like portions beside said sills and provided at opposite ends thereof with spindles for ground-engaging wheels, an automobile carrying deck carried by said sills between said walking beams, and means for yieldably suspending said axle from said sills including leaf springs extending through the box-like openings in said end pieces and terminally secured to said sills beside the walking beams.

3. In a vehicle running gear assembly, a pair of laterally spaced longitudinally extending sills, a transversely extending non-rotatable axle below said sills in spaced relation thereto and having axially aligned separately formed end pieces provided at their outer ends with spindle-like portions and provided at the inner ends of said spindle-like portions with box-like openings, walking beams rockably mounted on said spindle-like portions upon the outer sides of said sills and provided at their opposite ends with spindles for ground-engaging wheels, and means for yieldably suspending the axle from the sills including leaf springs extending through the box-like openings in said end pieces and terminally connected to said sills.

4. A running gear assembly for a vehicle having a deck, walking beams at opposite sides of said deck and provided at their opposite ends with spindles, and ground-engaging wheels on said spindles, comprising a transversely extending axle beneath said deck, the length of said axle being less than the width of said deck, spring-carrying brackets fastened to opposite ends of said axle and provided beyond opposite sides of the deck with laterally projecting spindle-like portions for supporting said walking beams, and means for yieldably suspending said axle from said deck including springs fastened to said brackets between the axle and spindle-like portions aforesaid.

5. In a running gear assembly, an axle, spring-carrying brackets fastened to opposite ends of said axle and provided in substantially axial alignment with said axle with laterally projecting spindle-like portions, walking beams rockably mounted on said spindle-like portions and provided at their opposite ends with spindles for ground-engaging wheels, and leaf springs fastened intermediate their ends to said brackets between and substantially in axial alignment with the axle and spindle-like portions of said brackets.

6. In a running gear assembly, a tubular axle, castings fastened to opposite ends of said axle and having laterally projecting spindle-like portions, walking beams rockably mounted on said spindle-like portions and provided at their opposite ends with spindles for ground-engaging wheels, and leaf springs fastened intermediate their ends to said castings between the axle and spindle-like portions of said castings.

7. In a running gear assembly for a vehicle having a frame, a transversely extending axle beneath said frame, spring-carrying brackets fastened to opposite ends of said axle and provided beyond opposite sides of said frame in substantially axial alignment with said axle with laterally projecting spindle-like portions, leaf springs fastened intermediate their ends to said brackets between and substantially in axial alignment with the axle and spindle-like portions of said brackets, and supporting brackets engaging said leaf springs at opposite ends thereof and attachable to the vehicle frame.

IRVING H. JUDD.